(12) United States Patent
Pietrobon et al.

(10) Patent No.: US 8,157,511 B2
(45) Date of Patent: Apr. 17, 2012

(54) TURBINE SHROUD GAS PATH DUCT INTERFACE

(75) Inventors: John Pietrobon, Outremont (CA); Eric Durocher, Vercheres (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 975 days.

(21) Appl. No.: 12/241,990

(22) Filed: Sep. 30, 2008

(65) Prior Publication Data

US 2010/0080699 A1   Apr. 1, 2010

(51) Int. Cl.
*F01D 5/20* (2006.01)
*F01D 11/08* (2006.01)

(52) U.S. Cl. .................... 415/173.1; 415/170.1; 277/641

(58) Field of Classification Search .............. 415/170.1, 415/173.1, 214.1, 173.3; 227/637, 641
See application file for complete search history.

(56) References Cited

U.S. PATENT DOCUMENTS

| | | | |
|---|---|---|---|
| 4,472,108 A | 9/1984 | Pask | |
| 4,573,866 A | 3/1986 | Sandy, Jr. et al. | |
| 5,145,316 A | 9/1992 | Birch | |
| 5,161,944 A | 11/1992 | Wood | |
| 5,192,185 A | 3/1993 | Leonard | |
| 5,562,408 A | 10/1996 | Proctor et al. | |
| 5,738,490 A | 4/1998 | Pizzi | |
| 5,797,723 A | 8/1998 | Frost et al. | |
| 5,988,975 A | 11/1999 | Pizzi | |
| 6,076,835 A * | 6/2000 | Ress et al. ..................... 277/637 |
| 6,435,820 B1 | 8/2002 | Overberg | |
| 6,682,300 B2 | 1/2004 | Bolms | |
| 6,984,106 B2 | 1/2006 | Thompson | |
| 7,040,857 B2 | 5/2006 | Chiu et al. | |
| 7,207,771 B2 | 4/2007 | Synnott et al. | |
| 7,217,089 B2 | 5/2007 | Durocher et al. | |
| 7,347,425 B2 | 3/2008 | James | |
| 2008/0063514 A1 | 3/2008 | Durocher et al. | |

* cited by examiner

*Primary Examiner* — Caridad Everhart
(74) *Attorney, Agent, or Firm* — Norton Rose Canada LLP

(57) ABSTRACT

An arrangement for sealing a turbine shroud gas path duct interface of a turbine engine comprises a static shroud surrounding a rotatable airfoil array and an annular duct downstream of the shroud with respect to a gas flow passing through the gas path. The shroud and the duct define a portion of the gas path for directing the gas flow, having an axially extending interface gap between the shroud and duct. An annular seal in use engages both the shroud and the duct, thereby sealing the annular gap.

19 Claims, 3 Drawing Sheets

TURBINE SHROUD GAS PATH DUCT INTERFACE

TECHNICAL FIELD

The concept relates generally to a gas turbine engine and more particularly, to a turbine shroud-gas path duct interface in a gas turbine engine.

BACKGROUND

Typically, an axial gap is provided between a high pressure turbine shroud and the outer wall of a downstream gas path duct at ambient temperatures, to allow for thermal expansion of the duct and/or the turbine shroud at engine operating temperatures. The magnitude of such thermal expansion can be predicted, and the gap sized, so that thermal expansion generally seals the gap to prevent leakage through the gap. However, the seal is not perfect and it must be ensured to adequately purge the adjacent cavity with sufficient cooling air to avoid hot gas ingestion. Reducing such uses of secondary air can increase gas turbine engine efficiency, however, and accordingly there is room for improvement.

SUMMARY

In one aspect, the present concept provides a sealing arrangement for a gas path of a turbine engine, which comprises a static shroud assembly mounted to an engine case and having an axially-extending annular platform surrounding a rotatable airfoil array, the platform having an inner side and an outer side and extending from a leading edge to a trailing edge, the shroud platform having a circumferentially extending chamfer along the outer side at the platform trailing edge; an annular duct extending downstream from the shroud platform trailing edge the shroud platform and the duct defining a portion of the engine main gas path, an axially extending annular gap provided between the shroud platform trailing edge and a leading end of the duct, the duct leading end having an inner side and an outer side, the duct having a circumferentially extending chamfer along the outer side at the leading end; and a compliant annular seal extending between and engaging co-operating annular sealing faces provided by the shroud chamfer and the duct chamfer, thereby sealing the annular gap.

In another aspect, the present concept provides a sealing arrangement for a gas path of a turbine engine, which comprises a static shroud surrounding a rotatable airfoil array; an annular duct downstream of the shroud with respect to a gas flow passing through the gas path, the shroud and the duct defining a portion of the gas path for directing the gas flow, having an axially extending annular gap between the shroud and duct; and an annular seal resiliently engaging both the shroud and the duct, thereby sealing the annular gap to prevent the gas flow from escaping from the gas path.

In a further aspect, the present concepts provides a gas turbine engine static shroud comprising an annular platform configured to encircle a rotating airfoil array and having a trailing edge, the platform including a chamfer portion at an outer side of the trailing edge to form an annular sealing face for engaging with a seal substantially along a circumferential length of the sealing face, the further comprising a wall extending radially outwardly from the platform outer side configured for engaging a seal holder of the seal.

Further details of these and other aspects of the present concept will be apparent from the detailed description and figures included below.

DESCRIPTION OF THE DRAWINGS

Reference is now made to the accompanying figures depicting aspects of the present concept, in which.

DETAILED DESCRIPTION

Figure 1:
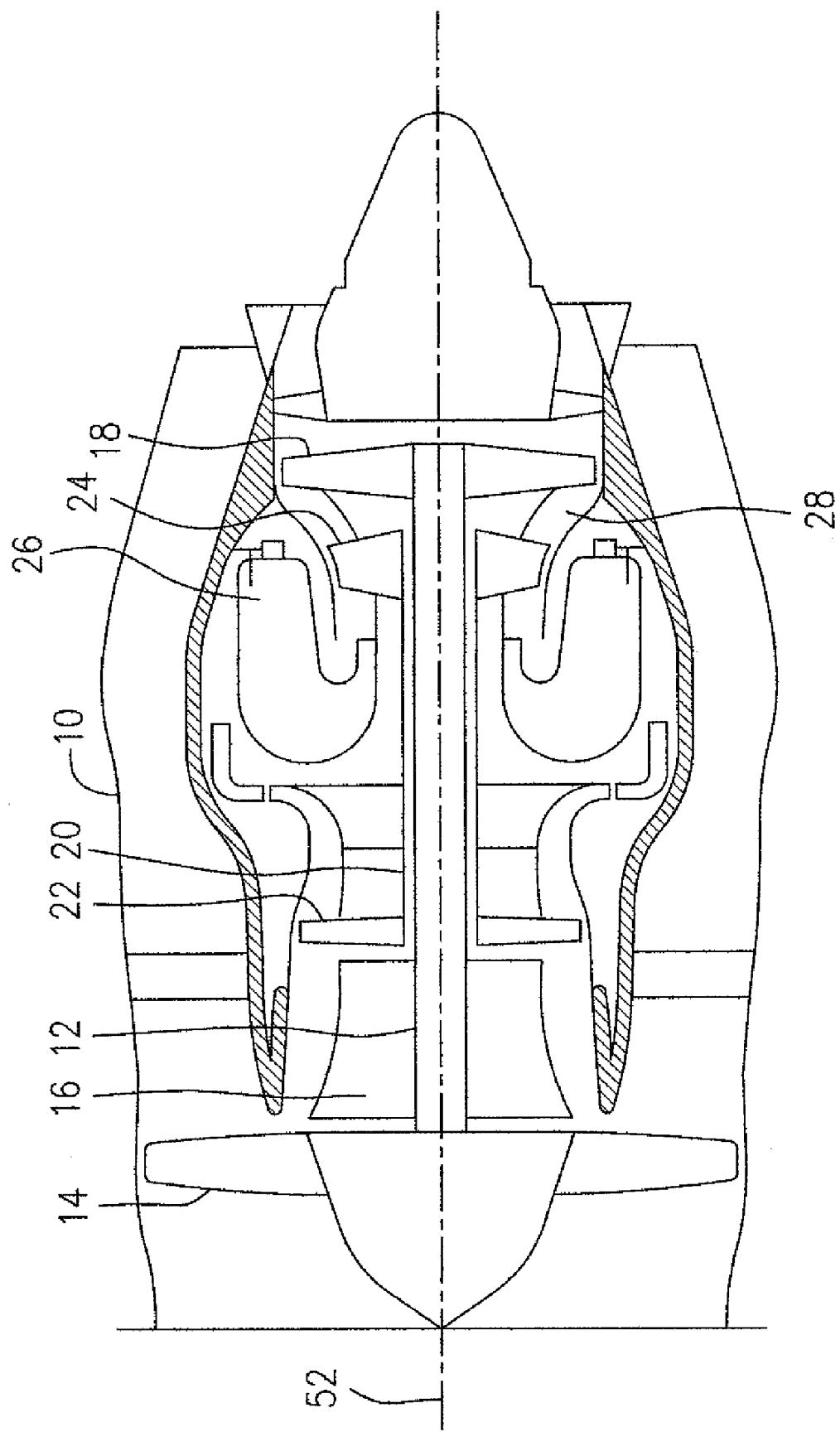
FIG. 1 is a schematic cross-sectional view of a gas turbine engine.

A typical application of the technique for a turbofan engine is illustrated schematically in FIG. 1. The turbofan engine includes a housing or nacelle 10, a low pressure spool assembly which includes a fan 14, low pressure compressor 16 and low pressure turbine 18 connected by shaft 12 and a high pressure spool assembly which includes a high pressure compressor 22 and high pressure turbine 24 connected by shaft 20. There is provided an annular combustor 26 where hot combustion gases are produced to pass through a gas path 28 for powering the turbines 24 and 18.

Figure 2:
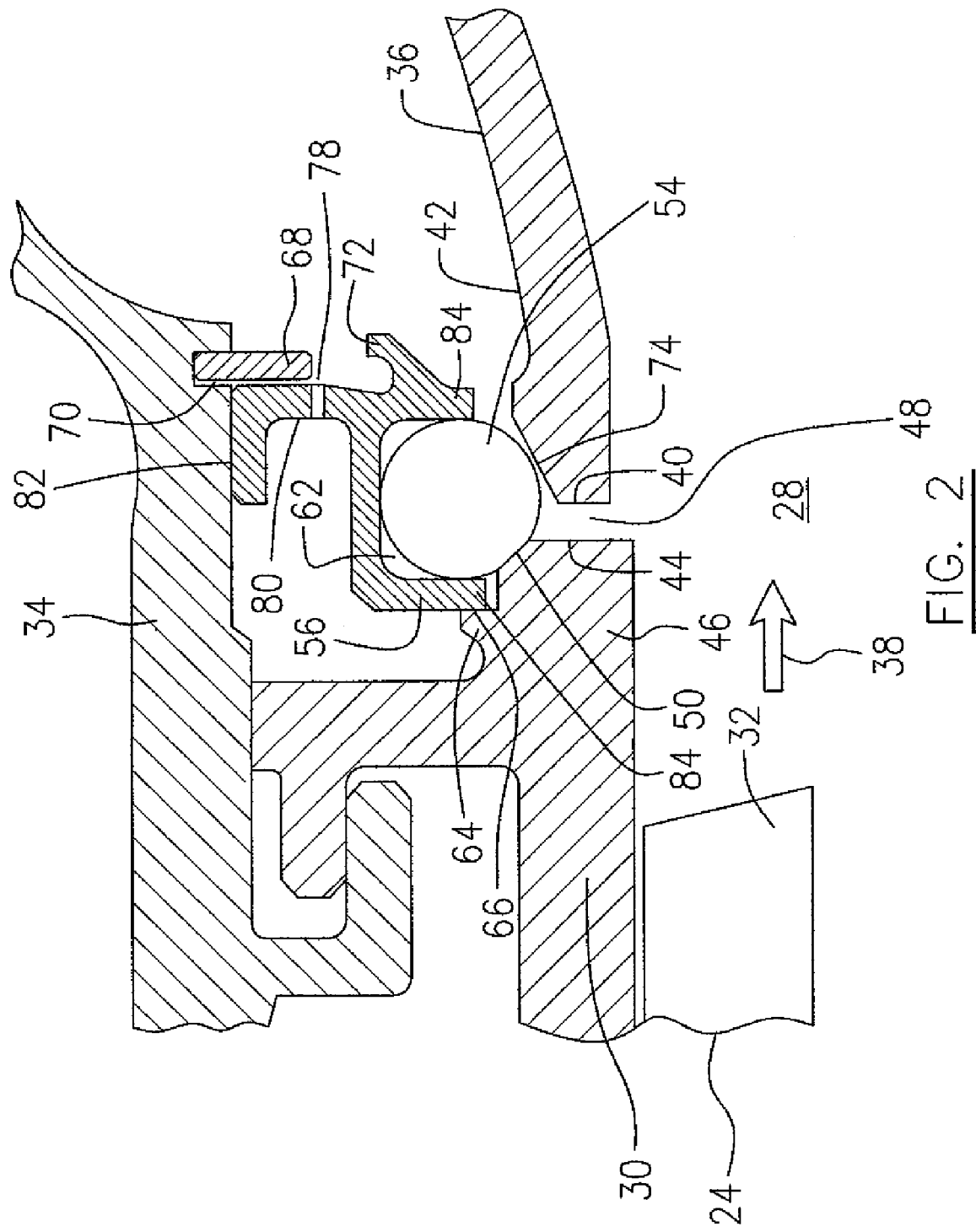
FIG. 2 is a partial longitudinal cross-sectional view of the gas turbine engine of FIG. 1, showing a sealing arrangement for a gas path of the turbine engine.

In FIGS. 1 and 2, a static turbine shroud 30 which surrounds a rotatable airfoil array 32, is mounted to an annular turbine support case 34. According to this embodiment, the rotatable airfoil array 32 is the high pressure turbine 24. An annular interturbine duct 36 is disposed downstream of the turbine shroud 30 to define a portion of the gas path 28 for directing a gas flow (indicated by arrow 38) to pass therethrough. In particular, a leading edge 40 of an annular outer wall 42 of the interturbine duct 36 aligns with a trailing edge 44 of an annular platform 46 of the turbine shroud 30 to define an outer boundary of the annular gas path 28. An inner boundary of the gas path 28 is formed by an annular blade platform (not shown) of the airfoil arrays 32 and an annular inner wall (not shown) of the interturbine duct 36. An axially extending annular gap 48 exists between the trailing edge 44 of the turbine shroud 30 and the leading edge 40 of the outer wall 42 of the turbine duct 36 in order to avoid interference due to thermal expansion of both the turbine shroud 30 and the interturbine duct 36.

Figure 4:
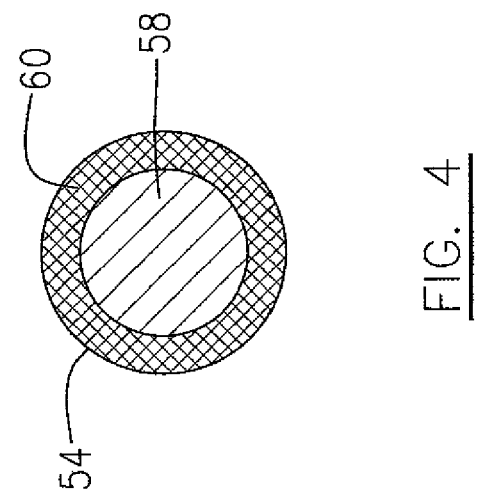
FIG. 4 is a cross-sectional view of a compliant seal used in the sealing arrangement of FIG. 2.
Figure 3:
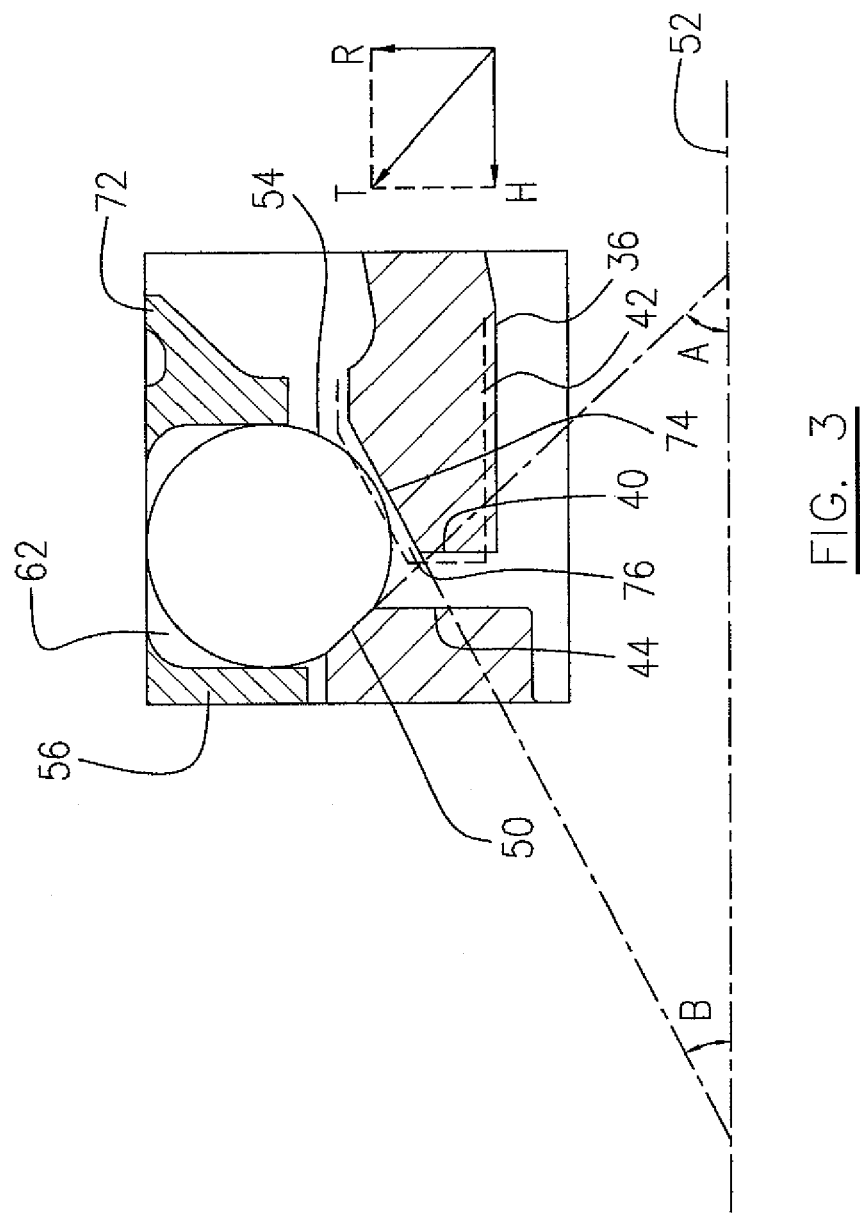
FIG. 3 is a partial view of FIG. 2 in an enlarged scale, showing the sealing arrangement in both engine non-operative and operative conditions.

Therefore, a sealing arrangement as illustrated in FIGS. 2-4 is employed according to this embodiment to prevent hot gas ingestion. The annular platform 46 of the turbine shroud 30 includes a chamfer portion which defines a sealing face 50 on the outer side of the trailing edge 44 for engaging with an annular seal 54. The sealing face 50 may, depending on the configuration of the seal 54 selected, extend generally tangentially relative to the cross-section of the seal 54, as will be discussed further below. In this example, the sealing face 50 may extend obliquely, for example at an angle A of between 35 and 55 degrees, with respect to a main axis 52 of the engine. The turbine shroud 30 further includes a positioning element 64, for example an annular ridge having a radially outwardly extending annular surface 66 disposed on the outer side of the annular platform 46 near the chamfer portion, for positioning a seal housing 56 which holds the seal 54 in position against the sealing face 50 of the turbine shroud 30.

The annular seal 54 is made of suitable material(s) which can provide a complaint seal, i.e. an adequate interface fit between sealing faces under compression forces, in an elevated temperature environment. In one example, the annular seal 54 may be a rope seal as shown in FIG. 4 which, in this example, includes a ceramic core 58 having a round cross-section wrapped by one or more layers of braided metal or alloy wires 60 such as braided Inconel™. The compliant annular seal 54 has an adequate ring diameter and cross-section diameter to abut the sealing face 50 of the turbine shroud 30.

The seal housing 56 includes a ring configuration having an adequate diameter to define spaced-apart radially extending walls 84 to provide an annular groove 62 to receive the annular seal 54. The annular groove 62 may have a width slightly greater than the cross-section diameter of the annular seal 54 and a depth slightly greater than half the cross-section diameter of the annular seal 54 such that the annular seal 54 is restrained from radial outward and axial movement by the seal housing 56. The inner side of the annular seal 54 is left exposed for sealing contact with both the turbine shroud 30 and the interturbine duct 36. The seal housing 56 is mounted within the turbine support case 34, with an axial flange 82 slidingly engaging the case 34, and is axially restrained in one direction by the positioning element 64 which provides the radially outwardly extending annular surface 66 to abut an upstream wall 84 of the seal housing 56 and in the other direction by a retainer 68, for example a spiral ring 68, which is received in a groove 70 defined in the turbine support case 34. A plurality of holes 78 may be provided through the radially extending wall 80 of the seal housing 56 to vent the cavity created between the housing 56, the case 34 and the shroud 30. The seal housing 56 may further include a hook member 72 which may be used to assist in pulling the seal housing 56 out of the turbine support case 34 when maintenance and repair service are required. The interturbine duct 36 delimits the gas path 28 between an outlet (not indicated) of the high pressure turbine 24 and an inlet (not indicated) of the low pressure turbine 18 and is supported within the turbine support case 34. The outer wall 42 of the interturbine duct 36 is also provided with a chamfer portion at an outer side of the leading edge 40 to form an annular sealing face 74. Depending on the configuration of the seal 54 selected, face 74 may extend generally tangentially relative to the cross-section of the seal 54, as will be discussed further below with reference to FIG. 3. In this example, face 74 may extend obliquely with respect to the main axis 52 of the engine, for example at an angle B smaller than 45 degrees, to create an interface fit with the annular seal 54.

The leading edge 40 of the outer wall 42 of the interturbine duct 36 substantially aligns with the trailing edge 44 of the platform 46 of the turbine shroud 30 such that both sealing faces 50 and 74 of the respective turbine shroud 30 and interturbine duct 36 are positioned adequately for a simultaneous interface fit with the seal 54 during engine operation.

It should be noted that during assembly procedures of the engine the interturbine duct 36 is positioned such that the sealing face 74 is initially spaced apart from the seal 54 which is already attached to the sealing face 50 of the turbine shroud 30, by a clearance 76 (see FIG. 3). The clearance 76 is predetermined so as to be closed by a thermal expansion of the interturbine duct 36 during engine operation, thereby providing an interface fit of the seal 54 with the sealing faces 50, 74 of the respective turbine shroud 30 and the interturbine duct 36.

As illustrated in FIG. 3, as the structure is heated when the gas turbine engine is operated, the sealing face 74 on the leading edge 40 moves axially and outwardly towards the annular seal 54 (as shown in broken lines) and compresses the annular seal 54 to create adequate sealing of the annular gap 48 (it will be understood that the turbine shroud also undergoes a similar thermal expansion process, although its magnitude may not be the same). The total displacement (T) of the sealing face 74 and the direction of displacement T depend on the combination of axial (H) and radial (R) components (i.e. the axial and radial thermal expansion) of the interturbine duct 36. Therefore, the clearance 76 and the chamfer angle of the oblique sealing face 74 with respect to the main axis 52 of the engine may be determined in accordance with the amount of respective axial H and radial R thermal expansion of the interturbine duct 36 and the ratio of axial to radial thermal expansion. For example, to cause the face 74 to move towards the nominal centre of seal 54 (i.e. the cross-section's axis of symmetry) to minimize tangential movement of the face 74 relative to the seal 54, which may be beneficial in reducing wear, etc., the angle of face 74 may be defined as substantially perpendicular to a direction of the displacement vector T.

The compliant seal and the structural configuration of the sealing arrangement according to this embodiment allow a sufficient compression rate to the seal and thus tolerate relative displacements of the interturbine duct. This may result in increased life span of engine parts and/or engine performance.

The above description is meant to be exemplary only, and one skilled in the art will recognize that changes may be made to the embodiments described without departing from the scope of the concept disclosed. For example, any suitable seal housing arrangement may be used to locate the annular seal. Any suitable turbine shroud configuration and/or duct upstream end configuration may be used, depending on the sealing arrangement selected. Although the shroud-duct interface described above involves an interturbine duct, any suitable shroud-duct interface may be considered. Still other modifications will be apparent to those skilled in the art, in light of a review of this disclosure, and such modifications are intended to fall within the appended claims.

The invention claimed is:

1. A sealing arrangement for a gas path of a turbine engine, the arrangement comprising:
   a static shroud assembly mounted to an engine case and having an axially-extending annular platform surrounding a rotatable airfoil array, the platform having an inner side and an outer side and extending from a leading edge to a trailing edge, the shroud platform having a circumferentially extending chamfer along the outer side at the platform trailing edge;
   an annular duct extending downstream from the shroud platform trailing edge the shroud platform and the duct defining a portion of the engine main gas path, an axially extending annular gap provided between the shroud platform trailing edge and a leading end of the duct, the duct leading end having an inner side and an outer side, the duct having a circumferentially extending chamfer along the outer side at the leading end; and
   a compliant annular seal extending between and engaging co-operating annular sealing faces provided by the shroud chamfer and the duct chamfer, thereby sealing the annular gap.

2. The sealing arrangement as defined in claim 1 wherein the annular sealing faces in use create an interface fit with the seal at engine operating temperatures.

3. The sealing arrangement as defined in claim 1 wherein the sealing face of the duct is spaced apart from the seal by a clearance when the engine is cold and not operating, and wherein the clearance is closed by thermal expansion of the duct at engine operating temperatures during engine operation.

4. The sealing arrangement as defined in claim 1, wherein the annular duct is subject to thermal expansion in use along a direction T, and wherein the chamfer along the outer side at the leading end of the annular duct is substantially perpendicular to the direction T.

5. The sealing arrangement as defined in claim 1 further comprising a seal housing mounted to and extending radially inwardly from the engine case the housing having spaced-apart circumferentially-extending radial walls configured for holding the seal therebetween and in contact with the chamfers.

6. The sealing arrangement as defined in claim 5 wherein the seal housing is axially retained between a surface extending radially outwardly from the outer side of the platform and a retainer ring mounted to the engine case.

7. The sealing arrangement as defined in claim 5 wherein the seal housing co-operates with at least the shroud to enclose a cavity upstream of the seal housing and wherein the seal housing includes a plurality of holes to vent said cavity downstream of the seal housing.

8. A sealing arrangement for a gas path of a turbine engine, the arrangement comprising:
   a static shroud surrounding a rotatable airfoil array;
   an annular duct downstream of the shroud with respect to a gas flow passing through the gas path, the shroud and the duct defining a portion of the gas path for directing the gas flow, having an axially extending annular gap between the shroud and duct;
   an annular seal resiliently engaging both the shroud and the duct, thereby sealing the annular gap to prevent the gas flow from escaping from the gas path; and
   wherein the duct comprises an outer wall having a leading edge substantially aligning with the trailing edge of the shroud, the outer wall of the duct including a chamfer portion at an outer side of the leading edge to form an annular sealing face extending oblique with respect to a main axis of the engine, in order to create an interface fit with the seal.

9. The sealing arrangement as defined in claim 8 wherein the oblique sealing face of the duct is initially spaced apart from the seal by a clearance which is closed by thermal expansion of the duct during engine operation.

10. The sealing arrangement as defined in claim 8 wherein the oblique sealing face of the duct extends in a direction at an angle smaller than 45 degrees with respect to the main axis.

11. The sealing arrangement as defined in claim 8 wherein the annular seal comprises a compliant annular rope seal including a ceramic core in a round cross section wrapped by one or more lagers of metal material.

12. The sealing arrangement as defined in claim 8 further comprising a seal housing holding the seal in position.

13. The sealing arrangement as defined in claim 12 wherein the seal housing is mounted to a turbine support case.

14. The sealing arrangement as defined in claim 13 wherein the seal housing is axially retained by a retainer in the turbine support case.

15. The sealing arrangement as defined in claim 8 wherein the shroud comprises an annular platform having a trailing edge, the platform including a chamfer portion at an outer side of the trailing edge to form an annular sealing face for engaging with the seal, the sealing face extending oblique with respect to a main axis of the engine for an interface fit with the seal.

16. The sealing arrangement as defined in claim 15 wherein the platform comprises a positioning element disposed on the outer side of the platform near the chamfer portion for positioning a seal housing to hold the seal in position against the sealing face of the shroud.

17. The sealing arrangement as defined in claim 15 wherein the oblique sealing face of the shroud extends in a direction at a angle of between 40 and 55 degrees with respect to the main axis.

18. A gas turbine engine static shroud comprising an annular platform configured to encircle a rotating airfoil array and having a trailing edge, the platform including a chamfer portion at an outer side of the trailing edge to form an annular sealing face for engaging with a seal substantially along a circumferential length of the sealing face, the further comprising a wall extending radially outwardly from the platform outer side configured for engaging a seal holder of the seal.

19. The static shroud as defined in claim 18 wherein the sealing face extends at an angle of between 35 and 55 degrees with respect to a main engine axis.

* * * * *